US008028143B2

(12) United States Patent
Hofmann et al.

(10) Patent No.: US 8,028,143 B2
(45) Date of Patent: Sep. 27, 2011

(54) METHOD AND APPARATUS FOR TRANSMITTING MEMORY PRE-FETCH COMMANDS ON A BUS

(75) Inventors: Richard Gerard Hofmann, Cary, NC (US); Mark Michael Schaffer, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 10/929,127

(22) Filed: Aug. 27, 2004

(65) Prior Publication Data
US 2006/0047914 A1 Mar. 2, 2006

(51) Int. Cl.
G06F 12/00 (2006.01)
(52) U.S. Cl. ............... 711/167; 711/204; 711/E12.057
(58) Field of Classification Search .................. 711/103, 711/105, 167, 204
See application file for complete search history.

(56) References Cited

U.S. PATENT DOCUMENTS

| 5,848,025 | A | 12/1998 | Marietta et al. | |
|---|---|---|---|---|
| 6,389,514 | B1 * | 5/2002 | Rokicki | 711/136 |
| 6,430,634 | B1 | 8/2002 | Mito | |
| 6,601,167 | B1 * | 7/2003 | Gibson et al. | 713/2 |
| 6,636,927 | B1 * | 10/2003 | Peters et al. | 710/309 |
| 2002/0056027 | A1 * | 5/2002 | Kanai et al. | 711/137 |
| 2003/0120852 | A1 * | 6/2003 | McConnell et al. | 710/316 |
| 2004/0096220 | A1 * | 5/2004 | Murata | 398/79 |
| 2004/0123042 | A1 * | 6/2004 | Shafi et al. | 711/137 |
| 2004/0123067 | A1 | 6/2004 | Sprangle et al. | |

FOREIGN PATENT DOCUMENTS

| JP | 11025670 A | 1/1999 |
|---|---|---|
| JP | 2002024007 | 1/2002 |
| KR | 1020000070846 | 11/2000 |

OTHER PUBLICATIONS

International Search Report—PCT/US05/030403, International Search Authority—European Patent Office—Feb. 10, 2006.
International Preliminary Report on Patentabiliy—PCT/US05/030403, IPEA/US—Nov. 5, 2007.
Written Opinion—PCT/US05/030403, International Search Authority—European Patent Office—Feb. 10, 2006.

* cited by examiner

*Primary Examiner* — Reginald Bragdon
*Assistant Examiner* — Hamdy Ahmed
(74) *Attorney, Agent, or Firm* — Nicholas J. Pauley; Peter M. Kamarchik; Jonathan T. Velasco (57) ABSTRACT

A processing system and method is disclosed wherein a processor may be configured to predict an address of memory from which data will be needed, transmit to a memory controller a pre-fetch command for the data at the predicted address of the memory, and transmit to the memory controller a read request for the data at the predicted address of the memory if the data is needed.

13 Claims, 4 Drawing Sheets

METHOD AND APPARATUS FOR TRANSMITTING MEMORY PRE-FETCH COMMANDS ON A BUS

BACKGROUND

1. Field

The present disclosure relates generally to digital systems, and more specifically, to methods and apparatuses for transmitting memory pre-fetch commands over a bus in a processing system.

2. Background

Integrated circuits have revolutionized the electronics industry by enabling new applications which were difficult or impossible to realize with discrete devices. Integration allows complex circuits consisting of millions of electronic components to be packaged into a single chip of semiconductor material. As a result, powerful computation devices such as computers, cellular phones, personal digital assistants (PDAs), and the like may be reduced to hand-held devices.

Integrated circuits are widely used today to implement sophisticated circuitry such as general purpose and specific application processors. A typical integrated processor may include a central processing unit (CPU) with system memory. A high bandwidth system bus may be used to support communications between the two. A bus is typically a shared channel or path between components on an integrated circuit. In addition, there may also be an external bus which may be used to access low latency off-chip memory under control of an on-chip memory controller.

The off-chip memory is generally formatted into pages. A page is normally associated with a row of memory. In most applications, the memory controller is capable of only opening a limited number of pages at a time. An "open page" means that the memory is pointing to a row of memory and requires only a column access command from the memory controller to read the data. To access an unopened page of memory, the memory controller must present a row access command to the memory to move the pointer before presenting a column access command to read the data. As a result, there is a latency penalty for closing a page in memory and opening a new one.

Many CPU implementations include a pre-fetch mechanism to compensate for the high latency typically encountered with off-chip memory devices. These CPUs may be configured to evaluate instruction streams and make requests for pages from the off-chip memory devices that may be needed in the future in order to reduce the latency and improve CPU performance. However, these pre-fetch requests can often be incorrect due to branches in the instruction stream, as well as CPU interrupts. Moreover, once a pre-fetch request has been accepted on the bus, the data will be read from the off-chip memory and transferred on the bus back to the CPU even though the data may no longer be required. This often leads to lower bandwidth on the bus, delaying CPU access to subsequent data from the off-chip memory device as the speculative data is transferred across the bus to the CPU.

The use of pre-fetch commands to interface a CPU to an off-chip memory device has provided a workable solution for many years. However, as the operating speed of CPU continues to increase exponentially, it is becoming increasingly desirable to reduce the latency typically associated with off-chip memory devices.

SUMMARY

In one aspect of the present invention, a method of retrieving data from memory includes predicting an address of the memory from which data will be needed, transmitting to a memory controller a pre-fetch command for the data at the predicted address of the memory, transmitting to the memory controller a read request for the data at the predicted address of the memory, and receiving the data at the predicted address of the memory in response to the read request.

In another aspect of the present invention, a method of retrieving data from memory includes predicting an address from an unopened page of the memory from which data will be needed, transmitting to a memory controller a pre-fetch command for the data at the predicted address of the memory, reading the data at the predicted address into a pre-fetch buffer, and discarding the data from the pre-fetch buffer.

In yet another aspect of the present invention, a processing system includes memory, a memory controller, and a processor configured to predict an address of the memory from which data will be needed, transmit to the memory controller a pre-fetch command for the data at the predicted address of the memory, and transmit to the memory controller a read request for the data at the predicted address of the memory if the data is needed, wherein the memory controller is further configured to deliver the data at the predicted address of the memory to the processor in response to the read request.

In a further aspect of the present invention, a processing system includes memory, a memory controller, means for predicting an address of the memory from which data will be needed, means for transmitting to the memory controller a pre-fetch command for the data at the predicted address of the memory, means for transmitting to the memory controller a read request for the data at the predicted address of the memory if the data is needed, and receiving means for receiving the data, wherein the memory controller is further configured to deliver the data at the predicted address of the memory to the receiving means in response to the read request.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Several embodiments of an integrated circuit with off-chip memory will be described to illustrate various inventive concepts. In at least one embodiment described herein, a CPU integrated on a chip may interface with off-chip memory through a memory controller in a way that tends to reduce the latency that is typically encountered with such configurations. Those skilled in the art will readily appreciate that these inventive concepts are not limited to such configurations, and may be applied to any processing system in which a bus mastering device communicates with memory. By way of example, a CPU may use the various inventive concepts described throughout this disclosure to communicate with on-chip memory. Alternatively, a discrete processor, or other bus mastering device, may be used to communicate with discrete memory.

Figure 1:
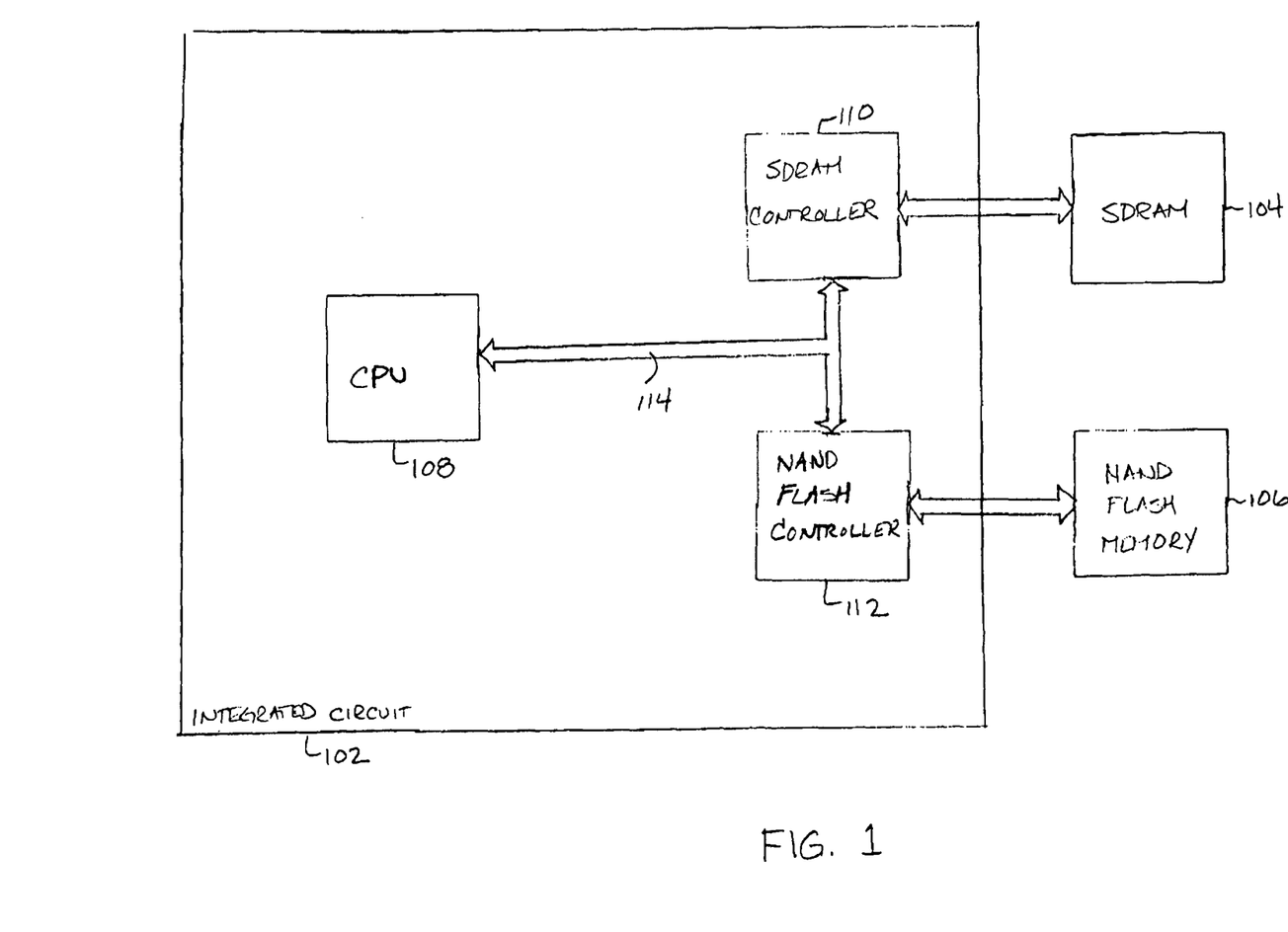
FIG. 1 is a conceptual block diagram illustrating an example of an integrated circuit with off-chip memory.

FIG. 1 is a conceptual block diagram illustrating an integrated circuit 102 with off-chip memory. The off-chip memory may be implemented with any storage device having a multiple page format, including by way of example, memory, registers, a bridge, or any other device capable of retrieving and storing information. In the embodiment shown in FIG. 1, the off-chip memory may include synchronous dynamic random access memory (SDRAM) 104 and NAND Flash memory 106. A CPU 108 may access the SDRAM 104 through a SDRAM memory controller 110, and access the NAND Flash memory 106 through a NAND Flash controller 112. The CPU 108 may be any processing component, including by way of example, a microprocessor, a digital signal processor (DSP), a programmable logic component, a combination of gates or transistor logic, or any other processing component.

The integrated circuit 102 may include a system bus 114 to interface the CPU 108 to the SDRAM controller 110 and the NAND Flash controller 112. The system bus 114 may also be used to provide communications between various other integrated components which have been omitted to avoid obscuring the various inventive concepts. The system bus 114 may be configured in a variety of ways depending on the specific application and the overall design constraints. By way of example, the system bus 114 may be implemented as a shared bus or a point-to-point switched connection.

In one embodiment of a processing system, a bus mastering device may be used to generate pre-fetch commands to access unopened pages in memory. By way of example, the CPU 108 shown in FIG. 1 may transmit a pre-fetch command over the system bus 114 to the SDRAM memory controller 110. The pre-fetch command may include an address that may be used by the SDRAM memory controller 110 to access a page of memory in the SDRAM 104 in anticipation of a future request for the data by the CPU 108. The SDRAM memory controller 110 may simply open the page of memory in the SDRAM 104, or alternatively, read a portion or all of the data from the page into a pre-fetch buffer. In the simplest configuration, the SDRAM memory controller 110 simply opens the page of memory in the SDRAM 104, and the CPU 108 gets the benefit of lower latency due to the fact that the page is already open, and therefore, does not require a row access command from the SDRAM memory controller 110. In an alternate configuration, the SDRAM memory controller 110 could implement a pre-fetch buffer in which it will read data from the page and store that data into its pre-fetch buffer. The amount of data read from the page may be predetermined, or alternatively, broadcast with the pre-fetch command. When the CPU 108 is ready to read the data, it simply reads the data from the pre-fetch buffer with a much lower latency than reading from the SDRAM 104. If the CPU 108 does not need the data, then the data may be discarded by the SDRAM memory controller 110, without having been transmitted across the CPU to SDRAM bus 114. The SDRAM memory controller 110 may determine that the CPU 108 does not need the data using any number of algorithms. By way of example, the SDRAM memory controller 110 may discard the data if it does not receive a read request from the CPU 108 within a predetermined time or a predetermined number of read requests to a different page. Alternatively, the SDRAM memory controller 110 may discard the data if it receives a subsequent pre-fetch command before it receives a read request for the data in the pre-fetch buffer.

In a similar manner, the CPU 108 shown in FIG. 1 may access the NAND Flash memory 106 by transmitting a pre-fetch command over the system bus 114 to the NAND Flash controller 112. The pre-fetch command may include an address that may be used by the NAND Flash controller 112 to access an unopened page of memory in the NAND Flash memory 106. The NAND Flash controller 112 may simply buffer the page of memory in the NAND Flash memory 106 to give the CPU 108 the benefit of lower latency for a subsequent read request. Alternatively, the NAND Flash controller 112 can read the data from the NAND Flash memory page buffer into a pre-fetch buffer in anticipation of a future request for the data by the CPU 108. If the CPU 108 does not need the data, then the data may be discarded by the NAND Flash controller 112. The NAND Flash controller 112 determines that the CPU 108 does not need the data in the same manner described earlier in connection with the SDRAM controller, or by any other means.

In the embodiments described thus far, the memory controller, whether it be the SDRAM memory controller 110, the NAND Flash controller 112, or any other memory controller, does not transmit the data to the bus mastering device in response to a pre-fetch command. The data is only transmitted across the system bus in response to a subsequent read request by the bus mastering device for the same address that was included in the pre-fetch command. Moreover, there is no requirement that the memory controller read the data into a pre-fetch buffer or even open the page in memory in response to the pre-fetch command. In certain embodiments, the pre-fetch command may provide nothing more than a notification from the bus mastering device that a certain address will be requested in the future and that if there is something that the memory controller can do to minimize the latency of the transfer it should do so, but is not required to do so.

In one embodiment of the integrated circuit 102, the system bus 114 may be implemented with an address channel, a write channel and a read channel. The address channel may be used by the CPU 108 to access a particular location in off-chip memory through the appropriate memory controller. Sideband signaling may be used to support pre-fetch commands, as well as other control signals that indicate, among other things, whether the CPU 108 is requesting a read or write operation. The write channel may be used to write data to off-chip memory through the appropriate memory controller and the read channel may be used to read data from off-chip memory through the appropriate memory controller. This bus structure is well known in the art.

Figure 2:
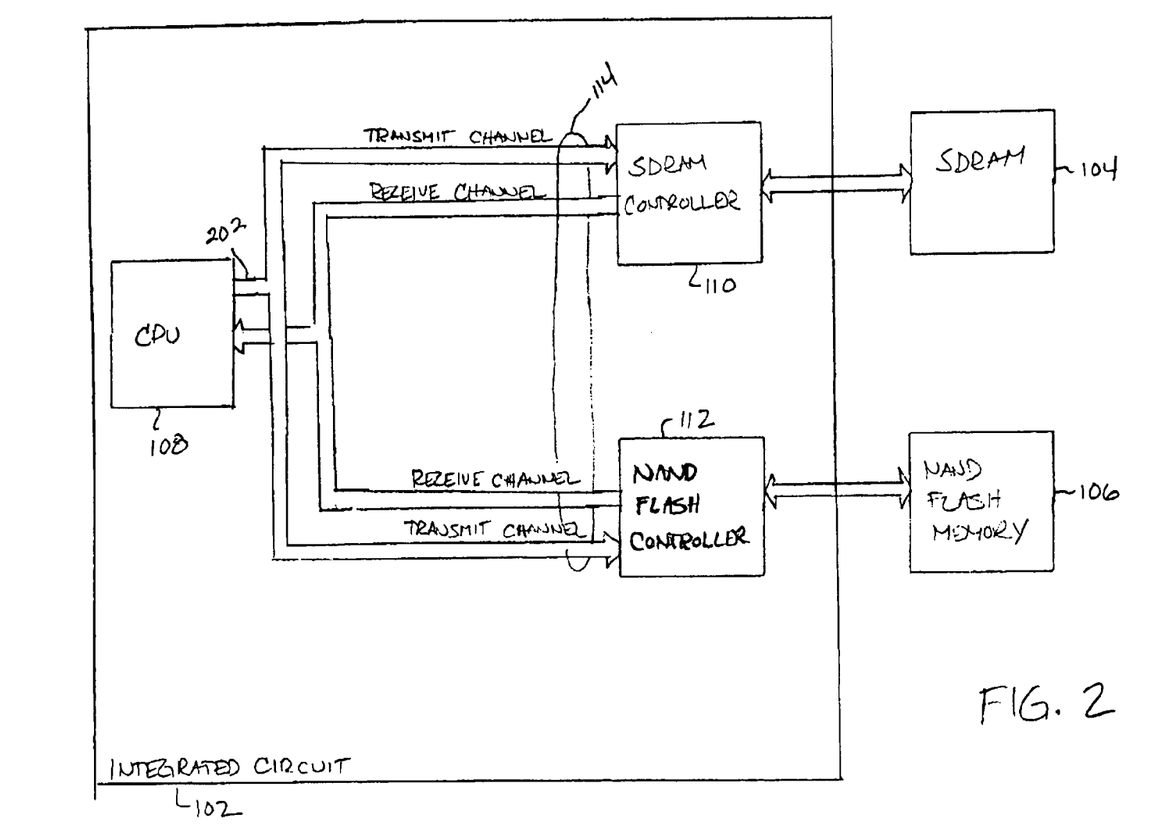
FIG. 2 is a conceptual block diagram illustrating another example of an integrated circuit with off-chip memory.

In an alternative embodiment of the integrated circuit 102, the bus structure may be configured to eliminate the address channel. This concept is illustrated in FIG. 2. The address channel may be eliminated by redefining the write channel as a "transmit channel" 202. The transmit channel 202 may be used as a generic medium for transmitting information between the CPU 108 and the appropriate memory controller in a time division multiplexed fashion. This information may include address information, control signals, and data to be written to off-chip memory. An example of a control signal is a signal that indicates the number of bytes to be read from or written to off-chip memory in one read or write operation. Another example of a control signal is a signal that indicates which byte lanes of the transmit channel will be used to transmit the data to be written to off-chip memory. By way of example, 2-bytes of data transmitted on a 32-bit transmit channel 202 will need 2 of the 4 byte lanes. This control signal may be used to indicate to the appropriate memory controller which of the 2 byte lanes on the transmit channel 202 will be used to transmit the data.

The various concepts described in connection with FIG. 2 may be implemented using any number of protocols. In the detailed description to follow, an example of a bus protocol will be presented. This bus protocol is being presented to illustrate the inventive aspects of a processing system, with the understanding that such inventive aspects may be used with any suitable protocol. The basic signaling protocol for the transmit channel is shown below in Table 1. Those skilled in the art will readily be able to vary and/or add signals to this protocol in the actual implementation of the bus structure described herein.

TABLE 1

| Signal | Definition | Driven By |
| --- | --- | --- |
| Clock | The reference clock signal. | Processing System |
| Valid | Valid information is being transmitted on the transmit channel. | CPU |
| Type (2:0) | Indicates the type of information being transmitted on the transmit channel. | CPU |
| Transfer Ack | Indicates memory controller is capable of accepting information on the transmit channel. | Memory Controller |
| Transmit Channel | Channel driven by the CPU to transmit information. | CPU |

The same signaling protocol may be used for the receive channel as shown below in Table 2.

TABLE 2

| Signal | Definition | Driven By |
| --- | --- | --- |
| Clock | The reference clock signal. | Processing System |
| Valid | Valid information is being transmitted on the receive channel. | Memory Controller |
| Type (2:0) | Indicates the type of information being transmitted on the receive channel. | Memory Controller |
| Transfer Ack | Indicates CPU is capable of accepting read data on the receive channel. | CPU |
| Receive Channel | Channel driven by the receiving component to broadcast information | Memory Controller |

The definition of the Type field used in this signaling protocol is shown in Table 3.

TABLE 3

| Type Value | Definition |
| --- | --- |
| 000 | Reserved |
| 001 | Valid Write Address |
| 010 | Valid Write Control Signals |
| 011 | Valid Write Data |
| 100 | Valid Read Pre-Fetch Command |
| 101 | Valid Read Address |
| 110 | Valid Read Control Signals |
| 111 | Valid Read Data |

The definition of the Valid and Transfer Ack signals in this signaling protocol is shown in Table 4.

TABLE 4

| Valid; Transfer Ack | Definition |
| --- | --- |
| 0; 0 | Valid information is not being transmitted, and the device at the other end of the bus is not ready to receive a transmission. |
| 0; 1 | Valid information is not being transmitted, but the device at the other end of the bus is ready to receive a transmission. |
| 1; 0 | Valid information is being transmitted, but the device at the other end of the bus is not ready to receive a transmission. |
| 1; 1 | Valid information is being transmitted, and the device at the other end of the bus is ready to receive a transmission |

Figure 3:
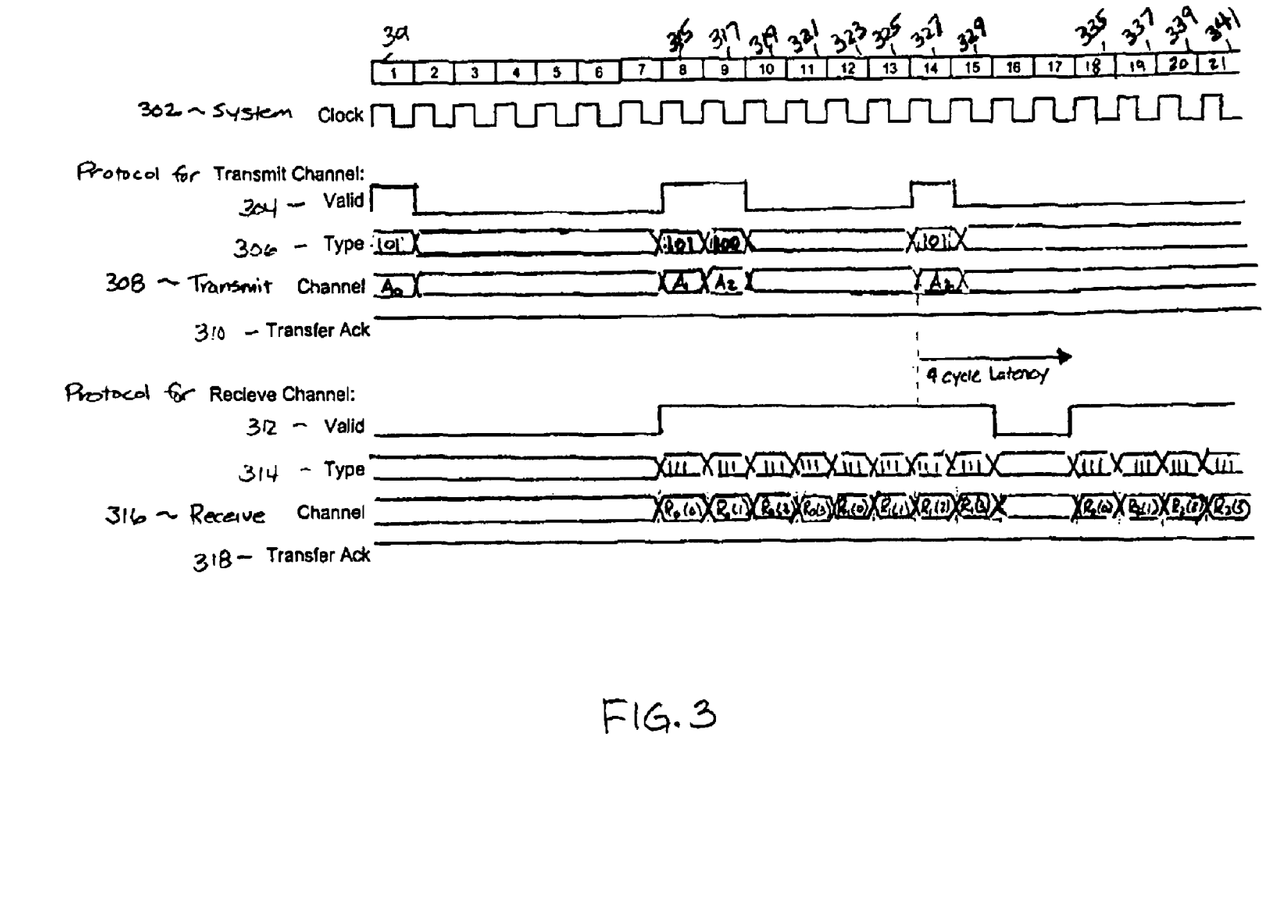
FIG. 3 is a timing diagram illustrating the use of a pre-fetch command to reduce the latency of a read operation from a SDRAM.

FIG. 3 is a timing diagram illustrating an example of how the pre-fetch command can be used to reduce the latency of a read operation from the SDRAM. In order to avoid obscuring the concepts of the present invention, the example illustrated in FIG. 3 is limited to read operations only. Moreover, the control signals for these read operations will not be shown. It will be understood by those skilled in the art that the control signals may be transmitted over the transmit channel in parallel to the address information for any given read operation simply by increasing the width of the bus and providing signaling to identify the byte lanes carrying the control signals.

In this example, the latency for accessing data from an unopened page in the SDRAM is seven clock cycles, while the latency for accessing data from the same page once opened is four clock cycles. The first two read operations in this example are from the same page in the SDRAM and the third read operation is from a different page in the SDRAM. By utilizing the pre-fetch command, the latency of the third read operation may be reduced from seven clock cycles to four clock cycles.

A System Clock 302 may be used to synchronize communications between the CPU and the SDRAM. The System Clock 302 is shown with twenty-one clock cycles, with each cycle numbered sequentially for ease of explanation.

The first read operation from an address in a closed page of memory may be initiated by the CPU during the first clock cycle 301. This may be achieved by asserting the Valid signal 304, setting the Type field 306 appropriately, and transmitting the address $A_0$ for the first read operation to the SDRAM controller on the Transmit Channel 308. The Type field 306 may be used by the SDRAM controller to determine that the CPU is requesting a read operation from the SDRAM at the address $A_0$. At the end of the first clock cycle 301, the CPU detects the assertion of the Transfer Ack signal 310 by the SDRAM controller, and determines that the transmission has been received and accepted.

In response to the first read operation request, the SDRAM controller may open the appropriate page in the SDRAM and begin to read the data from the address $A_0$. Due to the latency of the SDRAM, a seven clock cycle delay may be experienced before the data is available. Once the data is available, the SDRAM controller may assert the Valid signal 312 and set the Type Field 314 to signal a data transmission on the Receive Channel 316. The data transmission in this example requires 4 clock cycles to accommodate the amount of data requested by the CPU and the width of the Receive Channel 316. Consequently, the data may be transmitted over the Receive Channel 316 from the SDRAM controller to the CPU during the eighth, ninth, tenth and eleventh clock cycles 315, 317, 319, and 321. At the end of each of these clock cycles, the SDRAM controller detects the assertion of the Transfer Ack signal 318 by the CPU, and determines that the data transmission has been received and accepted.

During the eighth clock cycle 315, a second read operation may be requested by the CPU from the same page of the SDRAM containing the address $A_0$ for the first read operation. This may be achieved by asserting the Valid signal 304, setting the Type field 306 appropriately, and transmitting the address $A_1$ for the second read operation to the SDRAM controller on the Transmit Channel 308. The Type field 306 may be used by the SDRAM controller to determine that the CPU is requesting a read operation from the SDRAM at the address $A_1$. At the end of the eighth clock cycle 315, the CPU detects the assertion of the Transfer Ack signal 310 by the SDRAM controller, and determines that the transmission has been received and accepted.

Since the page in the SDRAM is already open, the latency of the SDRAM is reduced to four cycles, becoming available for transmission at the beginning of the twelfth clock cycle 323. Once the data is available, the SDRAM controller may assert the Valid signal 312 and set the Type Field 314 to signal a data transmission on the Receive Channel 316. The data transmission in this example also requires 4 clock cycles because of the amount of data requested and the width of the Receive Channel 316, and therefore, may be transmitted over the Receive Channel 316 during the twelfth, thirteenth, fourteenth, and fifteenth clock cycles 323, 325, 327 and 329. At the end of each of these clock cycles, the SDRAM controller detects the assertion of the Transfer Ack signal 318 by the CPU, and determines that the data transmission has been received and accepted.

During the eighth clock cycle 315, the CPU also predicts that it will need data from an address $A_2$ from a different page in the SDRAM, and as a result, may transmit a pre-fetch command over the Transmit Channel 308 in the ninth clock cycle 317. This may be achieved by asserting the Valid signal 304, setting the Type field 306 to indicate a pre-fetch command, and transmitting the address $A_2$ to the SDRAM controller on the Transmit Channel 308. In response to the pre-fetch command, the SDRAM controller may begin to open the new page of memory in the SDRAM in parallel with the transfer of data to the CPU over the Receive Channel 316 for the first read operation. At the end of the ninth clock cycle 317, the CPU detects the assertion of the Transfer Ack signal 310 by the SDRAM controller, and determines that the pre-fetch command has been received and accepted.

During the fourteenth clock cycle 327, the CPU determines that it definitely needs the data from the address $A_2$ in the SDRAM, and thus transmits a read request for this data. This may be achieved by asserting the Valid signal 304, setting the Type field 306 appropriately, and transmitting the address $A_2$ for the third read operation to the SDRAM controller on the Transmit Channel 308. The Type field 306 may be used by the SDRAM controller to determine that the CPU is requesting a read operation from the SDRAM at the address $A_2$. At the end of the fourteenth clock cycle 327, the CPU detects the assertion of the Transfer Ack signal 310 by the SDRAM controller, and determines that the transmission has been received and accepted.

Since the SDRAM controller has already opened the page of memory in the SDRAM containing the address $A_2$, the latency of the SDRAM may be reduced to four cycles, with the data becoming available for transmission at the beginning of the eighteenth clock cycle 335. Once the data is available, the SDRAM controller may assert the Valid signal 312 and set the Type Field 314 to signal a data transmission on the Receive Channel 316. The data transmission in this example requires 4 clock cycles because of the amount of data requested and the width of the Receive Channel 316, and therefore, may be transmitted over the Receive Channel 316 during the eighteenth, nineteenth, twentieth, and twenty-first clock cycles 335, 337, 339 and 341. At the end of each of these clock cycles, the SDRAM controller detects the assertion of the Transfer Ack signal 318 by the CPU, and determines that the data transmission has been received and accepted.

Figure 4:
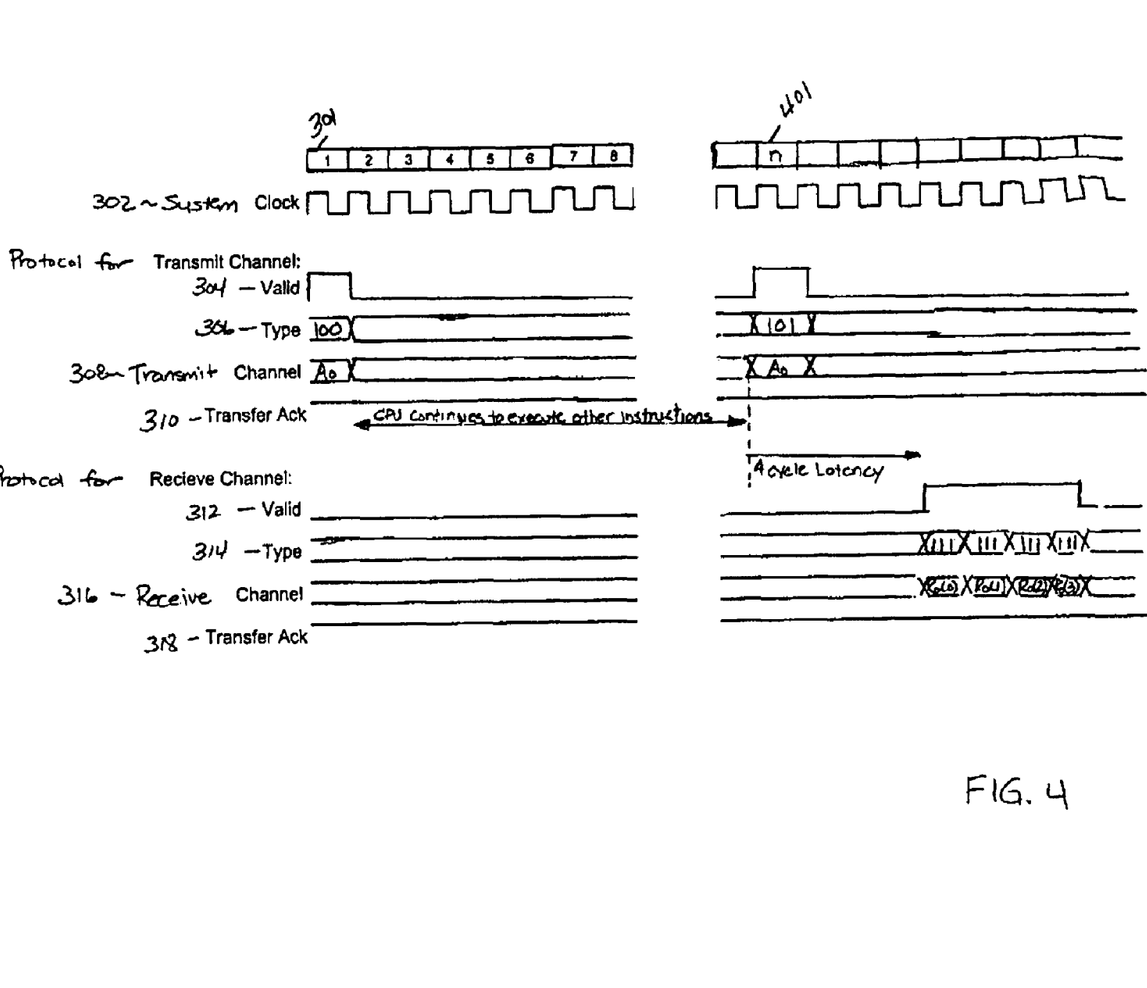
FIG. 4 is a timing diagram illustrating the use of a pre-fetch command to reduce the latency of a read operation from a NAND Flash memory.

FIG. 4 is a timing diagram illustrating an example of how the pre-fetch command can be used to reduce the latency of a read operation from the NAND Flash memory. In a manner similar to that used to describe pre-fetch commands in connection with the SDRAM, the example illustrated in FIG. 4 is limited to read operations only, and the control signals for those read operations are not shown. It will be understood by those skilled in the art that the control signals may be transmitted over the transmit channel in parallel to the address information for any given read operation simply by increasing the width of the bus and providing signaling to identify the byte lanes carrying the control signals.

In this example, the CPU will read data from the NAND Flash memory, which has a latency of n cycles. This latency is equal to the time required to read a full page of data, typically 512 bytes, from the NAND Flash memory into a large read buffer contained within the NAND Flash controller. The initial latency in most cases can be hundreds of clock cycles. If the CPU were to simply request a read operation to the NAND Flash controller for data from a closed page, the CPU may be stalled while it waited for the new page of data to be loaded into the NAND Flash controller. By issuing the pre-fetch command, the NAND Flash controller can read the data into the read buffer while the CPU continues to execute other instructions. In addition, the receive channel is available for data transmission to the CPU for other read operations. This tends to significantly improve the utilization of the receive channel.

During the first clock cycle 301, the CPU predicts that it will need data from an address $A_0$ in the NAND Flash memory, and as a result, may transmit a pre-fetch command over the Transmit Channel 308. This may be achieved by asserting the Valid signal 304, setting the Type field 306 to indicate a pre-fetch command, and transmitting the address $A_0$ for the pre-fetch command to the NAND Flash controller on the Transmit Channel 308. In response to the pre-fetch command, the NAND Flash controller may begin loading the new page of memory from the NAND Flash memory into the read buffer in the NAND Flash controller. At the end of the first clock cycle 301, the CPU detects the assertion of the Transfer Ack signal 310 by the NAND Flash controller, and determines that the pre-fetch command has been received and accepted.

In most cases, the process of loading the new page from the NAND Flash memory into the NAND Flash controller takes many cycles to complete. During this period, the CPU may continue to fetch and execute instructions from its external cache or external memories while it waits for the NAND Flash memory to load the new page of memory into the NAND Flash controller. In clock cycle n 401, where n is greater than or equal to the time required to load the read buffer in the NAND Flash controller, the CPU may request a read operation from the address $A_0$ by asserting the Valid signal 304, setting the Type field 306 appropriately, and transmitting the address $A_0$ to the NAND Flash controller on the Transmit Channel 308. At the end of the n clock cycle 401, the CPU detects the assertion of the Transfer Ack signal 310 by the NAND Flash controller, and determines that the transmission has been received and accepted.

Since the read buffer in the NAND Flash memory has already been loading with the page of memory from the NAND Flash controller, the latency may be reduced to the time necessary for the CPU to read the buffer in the NAND Flash controller across the Receive Channel. In this example, the read latency is reduced to four clock cycles. As a result, the data may become available four clock cycles after the CPU requests the read operation. Once the data is available, the NAND Flash controller may assert the Valid signal 312 and set the Type Field 314 to signal a data transmission on the Receive Channel 316. The data transmission in this example is transmitted over the Receive Channel 316 in four clock cycles. At the end of each of these clock cycles, the NAND Flash controller detects the assertion of the Transfer Ack signal 318 by the CPU, and determines that the data transmission has been received and accepted.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method comprising:
    transmitting a first instruction to a memory controller via a bus, the first instruction transmitted by a processor and including a memory address of data and a first type code, wherein the data is not received by the processor in response to the first instruction;
    transmitting a second instruction to the memory controller via the bus, the second instruction including the memory address and a second type code;
    wherein the first type code identifies the first instruction as a pre-fetch request and the second type code identifies the second instruction as a read request; and
    receiving the data at the processor in response to the read request;
    wherein the memory controller is configured to open a page of memory containing the data in response to receiving the prefetch request and to read the data from the opened page of memory in response to receiving the read request;
    wherein the memory controller is configured to wait to read the data from the opened page until the read request is received.

2. The method of claim 1, wherein the memory address is transmitted via a transmit channel of the bus, wherein the first type code is transmitted via a first sideband signal, and wherein the second type code is transmitted via a second sideband signal.

3. The method of claim 1, wherein the first instruction and the second instruction are transmitted in a time division multiplexed fashion on a transmit channel of the bus.

4. The method of claim 3, wherein the transmit channel comprises multiple byte lanes, and wherein at least one of the first instruction and the second instruction is transmitted on less than all of the multiple byte lanes, and wherein at least one of the "first instruction and the second instruction includes a first control signal to indicate to the memory controller which byte lanes of the multiple byte lanes will be used to transmit information to the memory controller.

5. The method of claim 3, wherein the second instruction includes a second control signal to indicate to the memory controller a number of bytes to be read from the memory address in response to the read request.

6. A system comprising:
    a processor;
    means for storing data that is retrieved from a memory in response to a pre-fetch command received, at the means for storing data, from the processor;

wherein the means for storing data is accessible to the processor via a system bus; and wherein the means for storing data is configured to discard the data in response to the means for storing data receiving a subsequent pre-fetch command before the means for storing data receives a read command for the data, wherein the means for storing data is further configured to retain the data independently of incoming read requests received at the means for storing data to access memory pages that do not correspond to the data.

7. A system comprising:

a processor;

means for storing data that is retrieved from a memory in response to a pre-fetch command received, at the means for storing data, from the processor;

wherein the means for storing data is accessible to the processor via a system bus; and wherein the means for storing data is configured to discard the data in response to the means for storing data receiving a subsequent pre-fetch command before the means for storing data receives a read command for the data, wherein the means for storing data includes a buffer and a memory controller, and wherein the memory controller is configured to receive a sideband signal that includes a type code, and wherein the memory controller is configured to use the type code to distinguish the pre-fetch command from the read command.

8. The system of claim 7, wherein the memory controller is configured to receive data from the processor via one or more byte lanes of the system bus in response to receiving a control signal from the processor that identifies the one or more byte lanes.

9. A system comprising:

a memory controller including a buffer, wherein the memory controller is configured to store data from a page of memory to the buffer in response to receiving a pre-fetch request for the data from a processor, wherein the memory controller is configured to send the data that is stored in the buffer to the processor in response to a read request for the data, and wherein the memory controller is further configured to discard the data that is stored in the buffer when in response to the memory controller receiving a subsequent pre-fetch request before the memory controller receives the read request for the data stored in the buffer, wherein the memory controller is further configured to discard the data that is stored in the buffer in response to receiving a predetermined number of read requests to a second data page without receiving the read request for the data stored in the buffer.

10. The system of claim 9, further comprising a time division multiplexed transmission channel to communicate instructions and data between the processor and the memory controller, wherein the time division multiplexed transmission channel comprises a plurality of byte lanes, and wherein the memory controller is configured to receive a control signal that identifies one or more of the plurality of byte lanes that will be used to transmit data to be written to off-chip memory.

11. The system of claim 10, wherein the memory controller is further configured to identify a type of an instruction received from the processor using a type code that is received at the memory controller via a sideband signal, wherein the type code indicates whether the instruction is a pre-fetch instruction or a read instruction.

12. The system of claim 9, wherein the bus comprises a time division multiplexed transmit channel to transmit first data and instructions from the processor to the memory controller, and further comprises a receive channel to transmit second data and instructions from the memory controller to the processor.

13. A method comprising:

storing data at a memory controller, the data retrieved from a memory in response to a pre-fetch command; and discarding the data from the memory controller in response to receiving a subsequent prefetch command before receiving a read command for the data, further comprising receiving a sideband signal at the memory controller, the sideband signal including a type code, and using the type code to distinguish the pre-fetch command from the read command.

\* \* \* \* \*